United States Patent
Suzuki

(10) Patent No.: US 6,601,473 B2
(45) Date of Patent: Aug. 5, 2003

(54) PLASTIC LEVER ASSEMBLY FOR POWER TRANSMISSION DEVICE

(75) Inventor: Tadasu Suzuki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/002,087

(22) Filed: Nov. 1, 2001

(65) Prior Publication Data

US 2002/0050184 A1 May 2, 2002

(30) Foreign Application Priority Data

Nov. 1, 2000 (JP) ......................................... 2000-335144

(51) Int. Cl.⁷ .................................................. G05G 1/04
(52) U.S. Cl. ........................ 74/579 R; 74/587; 474/110; 474/140
(58) Field of Search ........................... 74/579 R, 579 E, 74/594.1, 586, 587; 474/101, 110, 109, 112, 140

(56) References Cited

U.S. PATENT DOCUMENTS

| | | | | |
|---|---|---|---|---|
| 4,826,468 A | * | 5/1989 | Friedrichs | 474/101 |
| 5,222,917 A | * | 6/1993 | Shimaya et al. | 474/101 |
| 5,318,482 A | * | 6/1994 | Sato et al. | 474/111 |
| 5,820,502 A | * | 10/1998 | Schulze | 474/140 |
| 2002/0077204 A1 | * | 6/2002 | Kumakura | 474/140 |

FOREIGN PATENT DOCUMENTS

| | | |
|---|---|---|
| EP | 0867639 | 9/1998 |
| JP | (Hei) 7-36201 | 6/1995 |
| JP | (Hei) 2519476 | 9/1996 |

\* cited by examiner

*Primary Examiner*—Vinh T. Luong
*Assistant Examiner*—Bradley J. VanPelt
(74) *Attorney, Agent, or Firm*—Dann, Dorfman, Herrell and Skillman, P.C.; Henry H. Skillman

(57) ABSTRACT

A lever assembly includes a lever and a fastener for pivotally mounting the lever to a fixed support member. The lever is composed of a lever body made of a plastic and a reinforcement plate assembled with the plastic lever body. The lever body has a first groove formed in one surface of the lever body and extending from a central through-hole to a position in proximity of a mount hole formed at one end of the lever body, and a second groove formed in the opposite surface of the lever body and extending from the central through-hole to a position in proximity of the other end of the lever body. The reinforcement plate is fitted in the first and second grooves across the central through-hole of the lever body. The fastener comprised of a screw with flanged head has a portion lying over part of the reinforcement plate to prevent the reinforcement plate from displacing off the lever body.

7 Claims, 4 Drawing Sheets

PLASTIC LEVER ASSEMBLY FOR POWER TRANSMISSION DEVICE

BACKGROUND OF THE INVENTION

1. Field of the Invention

The present invention relates to a plastic lever, such as a tensioner lever or a guide lever, for use in a power transmission device including an endless chain trained around a driving sprocket and a driven sprocket, or a similar power transmission device including an endless belt trained around a driving pulley and a driven pulley.

2. Description of the Related Art

Conventionally, a tensioner lever and a guide lever are known as a lever used in a power transmission device having a chain or a belt (toothed belt, for example). Examples of such known lever are disclosed in Japanese Utility Model Registration No. 2519476 and Japanese Utility Model Publication No. (Hei) 7-36201. In general, the tensioner lever, in use, is in slide contact with the chain (or the belt) to apply a proper tension to the chain and also suppress vibration including lateral oscillation of the chain. The guide lever prevents undue stretch or slack of the chain (or the belt) when the chain is assembled on the driving and driven sprockets and while the chain is running around the sprockets. The guide lever also serves to prevent vibration including lateral oscillation of the chain while running.

FIG. 7 shows a conventional tensioner lever 100 composed of an arm 101 made of aluminum and a plastic shoe 102 provided on the arm 101 for sliding contact with a chain. The aluminum arm 101 has a thick longitudinal flange 101A, a mount hole 101B and a hollow portion 101C. The shoe 102 is attached to the flange 101A of the arm 101. The shoe 102 has a plurality of L-shaped side engagement strips 102A, 102B, 102C engaged with the flange 101A from one side thereof, a hook-shaped end engagement strip (not shown) engaged with a leading end of the arm 101 (when viewed from the direction of travel of the chain indicated by the arrow C), and an upright engagement strip 102E engaged with the flange 101A from the opposite side thereof. When assembling the tensioner lever 100, the plastic shoe 102 is forced over the arm 101 in a lateral direction with the upright engagement strip 102E directed forward until the L-shaped side engagement strips 102A-102C are engaged with the flange 102A on one side of the arm 101, and subsequently the upright engagement strip 102E is snap fit with a retaining recess (not shown) formed in a portion of the flange 101A on the other side of the arm 101. Reference numeral 103 shown in FIG. 7 denotes a pad adapted to be engaged with a tensioner (not shown). The conventional tensioner is pivotally mounted to a fixed member (engine body, for example) by means of a bolt (not shown) extending though the mount hole 101B. In operation, the tensioner urges the pad 103 to turn the tensioner lever 100 about the axis of the bolt in a direction to apply a proper tension to the endless chain running in the direction of the arrow C.

For attachment with the plastic shoe 102, the aluminum arm 102 of the conventional tensioner lever 100 is shaped into a complicated configuration including a flange, a mount hole and a hollow portion. Accordingly, when the arm is to be formed by casting, a casting die or mold of a complicated configuration is needed. This increases the manufacturing cost of the tensioner lever. In addition, due to the complicated configuration of the arm, the amount of metal material used is relatively large, leading to a further increase of the manufacturing cost. Alternatively when the arm is to be formed by press-working, the presence of a mount hole at an end of the arm requires cost-increasing additional precessing steps, such as rolling of a metal sheet into a tube, and insertion of a bushing into the tube. Thus, the press-formed arm is also expensive.

Furthermore, the plastic shoe 102 having various engagement strips 102A–102E of different shapes requires a molding die of a complicated configuration. In addition, the assembling process described above of the conventional tensioner 100 requires a certain care and muscular effort to secure reliable matching between the engagement strips 102A–102E and the corresponding parts of the arm 101.

With the foregoing problems in view, many attempts have been made to manufacture a lever (tensioner lever, guide lever and so on) made of a plastic. However, the prior attempts are still unsatisfactory in that due to a limited strength attained by the plastic, the plastic lever is made thick. The thick plastic lever requires a relatively large space for installation and operation. This poses a serious problem when the lever is used in an automobile engine or the like machine as a part of a power transmission device.

SUMMARY OF THE INVENTION

It is, accordingly, an object of the present invention to provide a lever assembly for a power transmission device, which is simple in construction, can be manufactured at a relatively low cost, is easy to assemble, is small in thickness but sufficient in strength, and occupies a relatively small space for installation with respect to a fixed support member such as an engine body.

To achieve the foregoing object, according to the present invention, there is provided a lever assembly for a power transmission device, which comprises a lever and a fastener for pivotally mounting the lever to a fixed support member. The lever includes a lever body made of a plastic having a mount hole extending from one surface to the opposite surface of the lever body at one end of the lever body, a central through-hole extending from the one surface to the opposite surface of the lever body at a central portion of the lever body, a first longitudinal groove formed in the one surface and extending from the central through-hole to a position in proximity to the mount hole, and a second longitudinal groove formed in the opposite surface and extending from the central through-hole to a position adjacent to the other end of the lever body. The lever also has a single reinforcement plate fitted in the first and second longitudinal grooves across the central through-hole of the lever body. The fastener extends through the mount hole and adapted to be threaded to the fixed support member so as to mount the lever pivotally to the fixed support member, the fastener having a portion lying over part of the reinforcement plate to prevent the reinforcement plate from displacing off the lever body.

The plastic lever body serves also as a shoe for sliding contact with a chain or a belt of a power transmission device. The lever body is made of a plastic, but by virtue of the reinforcement plate fitted in the first and second longitudinal grooves across the central through-hole of the lever body, the strength of the thus reinforced lever body is comparable to that of a lever made of metal.

In one preferred form of the present invention, the fastener comprises a screw having a flanged head, the flanged head lying over the part of the reinforcement plate.

In another preferred form of the present invention, the fastener comprises a flanged bushing fitted in the mount hole of the lever body and having a flange lying over the part of the reinforcement plate, and a headed screw extending through the bushing and adapted to be threaded to the fixed support member.

The reinforcement plate is assembled with the lever body by way of inserting the reinforcement plate through the central through-hole and subsequently turning the reinforcement plate about the central through-hole relative to the lever body. Thus, the reinforcement plate can be assembled with the plastic lever body with utmost ease.

It is preferable that the lever body is made of an engineering plastic, and the reinforcement plate is made of metal or fiber reinforced plastic.

BRIEF DESCRIPTION OF THE DRAWINGS

Preferred embodiments of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
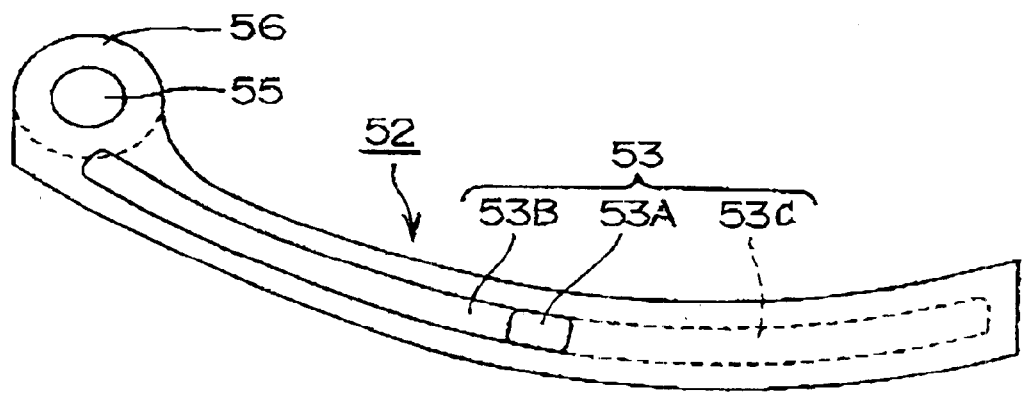
FIG. 1 is a plain view of a body of a tensioner lever according to a first embodiment of the present invention.
Figure 2:
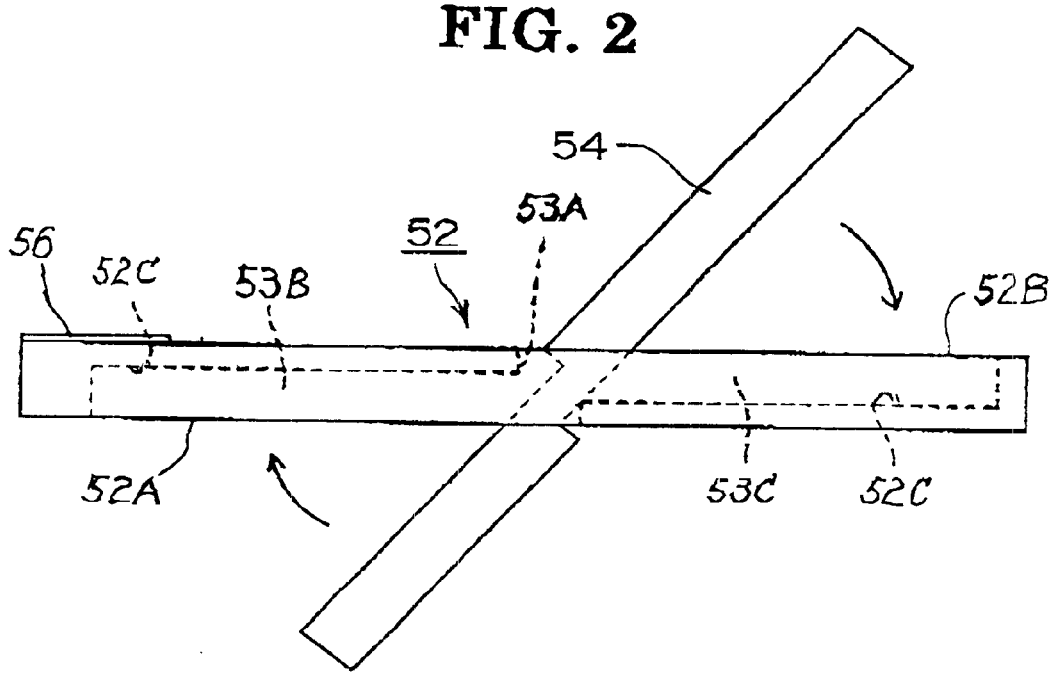
FIG. 2 is a front elevational view showing the manner in which a reinforcement plate is assembled with the tensioner lever body.
Figure 3:
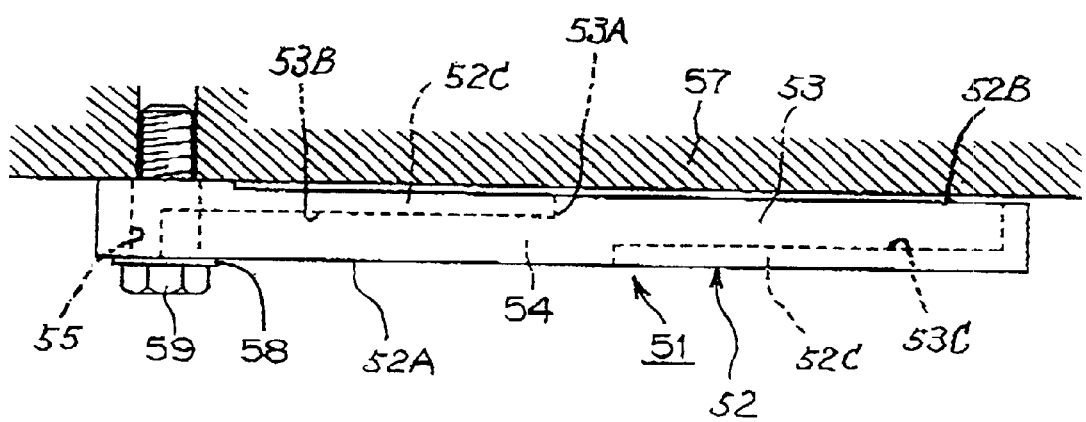
FIG. 3 is a front elevational view showing the tensioner lever mounted to an engine body.
Figure 4:
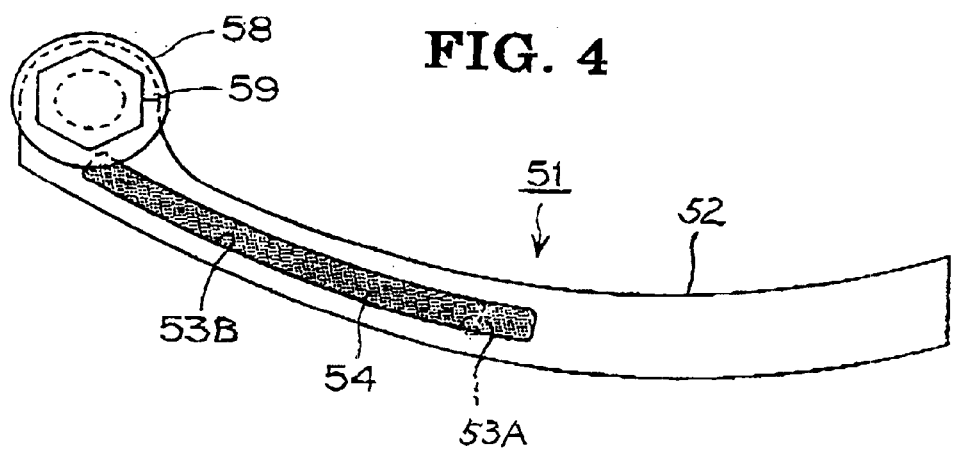
FIG. 4 is a plain view of the tensioner lever.

FIGS. 1 through 4 show a tensioner lever assembly according to a first embodiment of the present invention. As shown in FIGS. 3 and 4, the tensioner lever assembly is comprised of a plastic tensioner lever 51 pivotally mounted by a fastener 59 to a fixed support member 57 (FIG. 4) such as an engine, as a part of a power transmission device including a chain trained around a driving sprocket and a driven sprocket (neither shown). The tensioner lever 51 is composed of a lever body 52 and a reinforcement plate 54 assembled with the lever body 52. In FIG. 4, the reinforcement plate 54 is stippled for clarity.

The lever body 52 is made of a plastic, preferably an engineering plastic and has a circular mount seat 56 at one end (left end in FIG. 3) thereof. As shown in FIGS. 1 and 2, the lever body 52 has a mount hole 55 extending from one surface 52A and the opposite surface 52B of the plastic lever body 52 along the axis of the mount seat 56, a central through-hole 53A extending from the surface 52A to the opposite surface 52B at a central portion of the lever body 52, a first longitudinal groove 53B formed in the surface 52A and extending from the central through-hole 53A to a position in proximity to the mount hole 55, and a second longitudinal groove 53C formed in the opposite surface 52B and extending from the central through-hole 53A to a position in proximity to the other end (right end in FIGS. 1 and 2) of the lever body 52. The central through-hole 53A and the first and second grooves 53B and 53C connected at one end by the central through-hole 53A jointly form a longitudinal recessed portion 53 of the lever body 52. The first and second grooves 53B, 53C each have a bottom wall 52C.

The reinforcement plate 54 has a shape complementary in contour to the shape of the recessed portion 53 of the lever body 52. The reinforcement plate 54 is firmly fitted in the recessed portion 53 so that the reinforcement plate 54 is coextensive with the first and second grooves 53B, 53C across the central through-hole 53A. The reinforcement plate 54 is made of metal or fiber reinforced plastic (FRP) containing glass fibers, carbon fibers, boron fibers, aramide fibers as a reinforcement material. In assembly of the tensioner lever 51, the reinforcement plate 54 is inserted through the central through-hole 53A of the lever body 52 and subsequently turned about the central through-hole 53A (i.e., a central stepped portion of the reinforcement plate 54) relative to the lever body 52 until the reinforcement plate 54 is firmly fitted in the recessed portion 53 of the lever body 52.

Referring back to FIGS. 3 and 4, the fastener 59 is comprised of a screw 59 having a flanged head (also called "seated head") 58. The screw 59 extends through the mount hole 55 of the lever body 52 and is threaded to the fixed support member 57 so as to mount the tensioner lever 51 pivotally to the fixed support member 57. As clearly shown in FIG. 6, the flanged head 59 lies over an end portion of the reinforcement plate 54 to prevent the reinforcement plate 54 from displacing off the lever body 52. The screw 59 with flanged head 58 may be replaced with a combination of a general headed screw and a washer (not shown), the washer having a size large enough to overlie an end portion of the reinforcement plate 54.

In the tensioner lever 51 of the foregoing construction, since an end of the recessed portion 53 of the lever body 52 is in the proximity of the mount hole 55, and since the screw fastener 59 has a portion (flanged head) 58 lying over an end portion of the reinforcement plate 54 received in the recessed lever body portion 53, the reinforcement plate 54 is prevented from displacing off the lever body 52. By tightly securing the screw fastener 59 to the fixed support member 57, the opposite end portion of the reinforcement plate 54, which is received in the second groove 53C, is urged against the bottom wall 52C of the lever body 52. Thus, the reinforcement plate 54 is firmly assembled with the lever body 52 against accidental detachment or separation.

Figure 5:
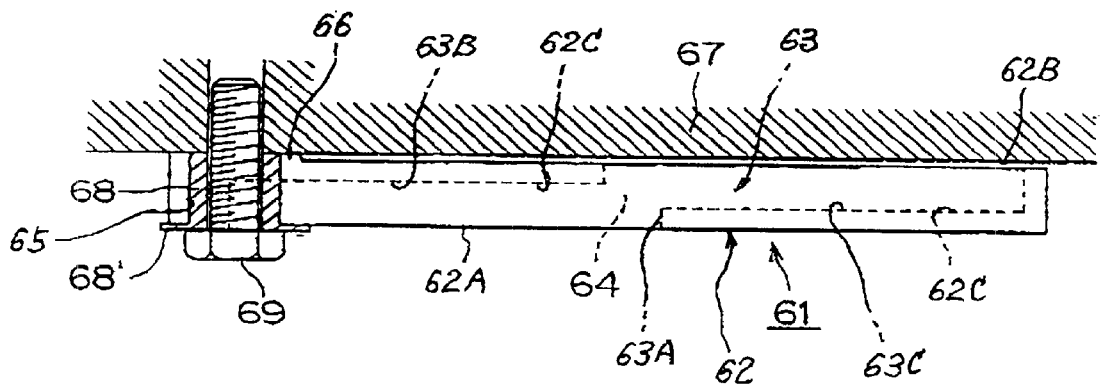
FIG. 5 is a view similar to FIG. 3, but showing a tensioner lever according to a second embodiment of the present invention.
Figure 6:
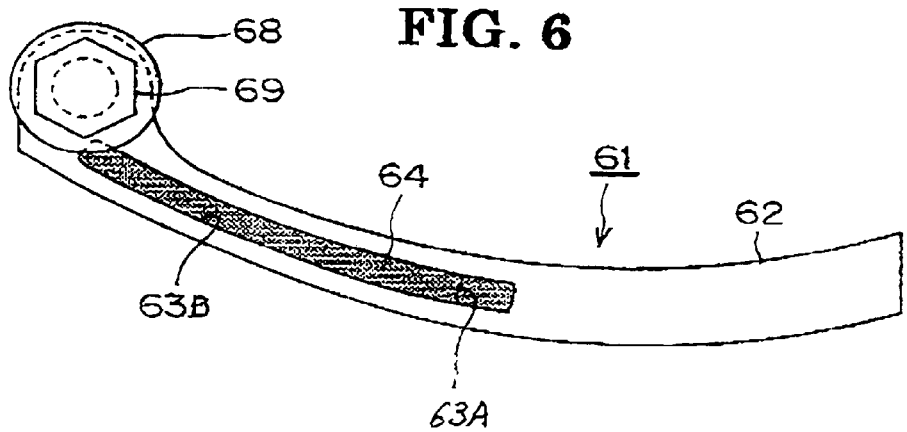
FIG. 6 is a plain view of the tensioner lever shown in FIG. 5.
Figure 7:
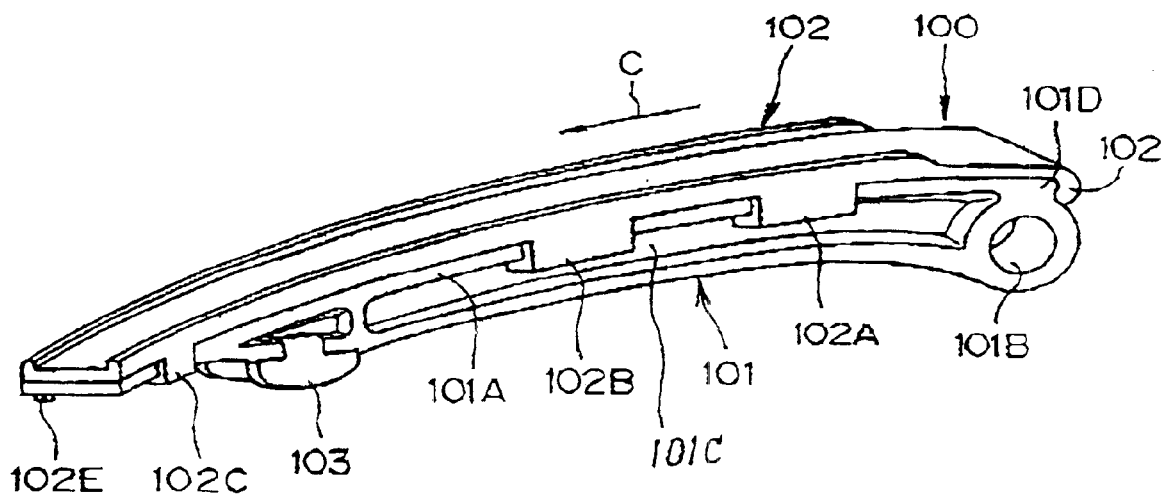
FIG. 7 is a perspective view showing a conventional tensioner lever.

FIGS. 5 and 6 show a tensioner lever assembly according to a second embodiment of the present invention. The tensioner lever assembly is comprised of a plastic tensioner lever 61 pivotally mounted by a fastener 68, 69 to a fixed support member 67 (FIG. 5) such as an engine. The tensioner lever 61 is composed of a lever body 62 and a reinforcement plate 64 assembled with the lever body 62. In FIG. 6, the reinforcement plate 64 is stippled for clarity.

The lever body 62 is made of a plastic, preferably an engineering plastic and has a circular mount seat 66 (FIG. 5) at one end (left end) thereof and a mount hole 65 (FIG. 5) extending from one surface 62A and the opposite surface 62B of the plastic lever body 62 along the axis of the mount seat 66. The lever body 62 also has a central through-hole 63A extending from the surface 52A to the opposite surface 62B at a central portion of the lever body 62, a first longitudinal groove 63B formed in the surface 62A and extending from the central through-hole 63A to a position in proximity to the mount hole 65, and a second longitudinal groove 63C (FIG. 5) formed in the opposite surface 62B and extending from the central through-hole 63A to a position in proximity to the other end (right end in FIGS. 5 and 6) of the lever body 62. The central through-hole 63A and the first and second grooves 63B and 63C connected at one end by the central through-hole 63A jointly form a longitudinal recessed portion 63 of the lever body 62. The first and second grooves 63B, 63C each have a bottom wall 62C.

The reinforcement plate 64 has a shape complementary in contour to the shape of the recessed portion 63 of the lever body 62 and is firmly fitted in the recessed portion 63 so that the reinforcement plate 64 is coextensive with the first and second grooves 63B, 63C across the central through-hole 63A. The reinforcement plate 64 is made of metal or fiber reinforced plastic (FRP) containing glass fibers, carbon fibers, boron fibers, aramide fibers as a reinforcement material. The reinforcement plate 64 is assembled with the lever body 62 in the same manner as described above with respect to the tensioner lever 51 of the first embodiment shown in FIGS. 1 to 4, particularly in FIG. 2.

The fastener 68, 69 comprises a flanged bushing 68 fitted in the mount hole 65 of the lever body 62 and having a flange 68' lying over an end portion of the reinforcement plate 64, and a screw 69 with hexagonal head extending through the bushing 68 and is threaded to the fixed support member 67. Thus, the reinforcement plate 64 is prevented from displacing off the lever body 62. The bushing 68 is made of metal or a plastic, preferably an engineering plastic.

In the tensioner lever 61 of the foregoing construction, because an end of the recessed portion 63 of the lever body 62 is in the proximity of the mount hole 65, and because the bushing 68 used in combination with a headed screw 69 has a portion (flange) 68' lying over an end portion of the reinforcement plate 64 fitted in the recessed lever body portion 63, the reinforcement plate 64 is prevented from displacing off the lever body 62. By tightly securing the screw 69 to the fixed support member 67 with the flanged bushing 68 disposed therebetween, the opposite end portion of the reinforcement plate 64, which is received in the second groove 63C, is urged against the bottom wall 62C of the lever body 62. Thus, the reinforcement plate 64 is firmly assembled with the lever body 62 against accidental detachment or separation.

In the embodiments described above, the plastic lever for a power transmission device according to the present invention takes the form of a tensioner lever. The plastic lever may, however, take the form of a guide lever. Furthermore, the shape of the lever should by no means be limited to a curved or arcuate configuration as in the illustrated embodiments but may include a straight configuration provided that the plastic body has an arcuate surface at one side thereof for sliding contact with a chain or a belt of the power transmission device. The reinforcement plate may take a straight configuration. In addition, the reinforcement plate may be attached by bonding to the recessed portion of the lever body.

It will be appreciated from the foregoing description that the lever composed of a plastic lever body and a reinforcement plate firmly fitted in a longitudinal recessed portion of the lever body is simple in construction and can be manufactured at a relatively low cost. The plastic lever body is able to provide its one surface as a shoe surface for sliding contact with a chain or a belt of the power transmission device. In addition, the reinforcement plate can easily be assembled with the lever body by merely inserting the reinforcement plate through a central through-hole of the lever body and subsequently turning the reinforcement plate about the through-hole relative to the lever body until the reinforcement is fitted in the recessed portion of the lever body. This contributes to the reduction of the manufacturing cost.

The lever body is made of a plastic but has a sufficient strength due the presence of the reinforcement plate. The reinforcement plate allows the lever body to be reduced in thickness. A thinner lever body occupies only a smaller space when it is installed on the supporting member such as an engine. In the case where the reinforcement plate is made of metal, a press work may be used to form the reinforcement plate into a desired shape. The press work contributes the reduction of manufacturing cost.

Obviously, various minor changes and modifications of the present invention are possible in the light of the above teaching. It is therefore to be understood that within the scope of the appended claims, the present invention may be practiced otherwise than as specifically described.

What is claimed is:

1. A lever assembly for a power transmission device, comprising a lever and a fastener for pivotally mounting the lever to a fixed support member, the lever including
a lever body made of a plastic having a mount hole extending from one surface to the opposite surface of the lever body at one end of the lever body, a central through-hole extending from the one surface to the opposite surface of the lever body at a central portion of the lever body, a first longitudinal groove formed in the one surface and extending from the central through-hole to a position in proximity to the mount hole, and a second longitudinal groove formed in the opposite surface and extending from the central through-hole to a position adjacent to the other end of the lever body, and
a single reinforcement plate fitted in the first and second grooves across the central through-hole of the lever body, and
the fastener extending through the mount hole and adapted to be threaded to the fixed support member so as to mount the lever pivotally to the fixed support member, the fastener having a portion lying over part of the reinforcement plate to prevent the reinforcement plate from displacing off the lever body.

2. The lever assembly according to claim 1, wherein the fastener comprises a screw having a flanged head, the flanged head lying over the part of the reinforcement plate.

3. The lever assembly according to claim 1, wherein the fastener comprises a flanged bushing fitted in the mount hole of the lever body and having a flange lying over the part of the reinforcement plate, and a headed screw extending through the bushing and adapted to be threaded to the fixed support member.

4. The lever assembly according to claim 1, wherein the reinforcement plate is assembled with the lever body by way of inserting the reinforcement plate through the central through-hole and subsequently turning the reinforcement plate about the central through-hole relative to the lever body.

5. The lever assembly according to claim 1, wherein the lever body is made of an engineering plastic.

6. The lever assembly according to claim 1, wherein the reinforcement plate is made of metal or fiber reinforced plastic.

7. A method for reinforcing a lever assembly for a power transmission device comprising a lever for pivotal mounting to a fixed support member, the lever including a lever body made of a plastic having a mount hole extending from one surface to the opposite surface of the lever body at one end of the lever body, a central through-hole extending from the one surface to the opposite surface of the lever body at a central portion of the lever body, a first longitudinal groove formed in the one surface and extending from the central through-hole to a position in proximity to the mount hole, and a second longitudinal groove formed in the opposite surface and extending from the central through-hole to a position adjacent to the other end of the lever body, said method comprising providing a single reinforcement plate adapted to be fitted in the first and second grooves across the central through-hole of the lever body, and a fastener adapted to pass through the mount hole and be threaded to the fixed support member so as to mount the lever pivotally to the fixed support member, the fastener having a flange portion adapted to extend beyond the mount hole and lie over part of the first longitudinal groove in proximity to the mount hole, inserting the reinforcement plate through the central through-hole and subsequently turning the reinforcement plate about the central through-hole relative to the lever body to engage in said first and second grooves, and inserting said fastener through said mount hole and threading the fastener to the fixed support member to cause the flange portion to capture said reinforcing plate within the first longitudinal groove.

\* \* \* \* \*